US006793479B1

(12) United States Patent
Merret et al.

(10) Patent No.: US 6,793,479 B1
(45) Date of Patent: Sep. 21, 2004

(54) REMOTELY ACTUATED LOCALIZED PRESSURE AND HEAT APPARATUS AND METHOD OF USE

(75) Inventors: John B. Merret, Morgan, UT (US); DeVor R. Taylor, Kaysville, UT (US); Mark M. Wheeler, Kamas, UT (US); Dan R. Gale, Salt Lake City, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/062,046

(22) Filed: Apr. 17, 1998

(51) Int. Cl.[7] .......................... B29C 43/02; B29C 70/06

(52) U.S. Cl. .................... 425/501; 156/580; 156/583.1; 425/394; 425/508; 425/520; 425/405.1

(58) Field of Search ................................ 425/394, 403, 425/405.1, 501, 508, 520; 156/580, 583.1, 583.3

(56) References Cited

U.S. PATENT DOCUMENTS 3,012,601 A * 12/1961 Lee ......................... 156/583.3
3,533,352 A * 10/1970 Miller ...................... 156/583.3
3,775,033 A * 11/1973 Pfeiffer ....................... 425/520
4,032,387 A * 6/1977 Sugiyama et al. ....... 156/583.3
4,247,355 A * 1/1981 Friedrick et al. ........ 156/583.3
4,248,649 A 2/1981 Harrison et al.
4,470,860 A 9/1984 Gill et al.
4,583,352 A * 4/1986 Heron ..................... 156/583.3
4,704,183 A * 11/1987 Sigerist ................... 156/583.3
4,755,128 A * 7/1988 Alexander et al. .......... 425/520
4,776,996 A 10/1988 Ashton et al.
4,797,172 A 1/1989 Hebert et al.
5,022,845 A 6/1991 Charlson et al.
5,071,506 A 12/1991 Nelson et al.
5,108,532 A * 4/1992 Thein et al. ............. 156/583.3
5,173,315 A 12/1992 Charlson et al.
5,273,602 A 12/1993 Gill et al.
5,468,315 A * 11/1995 Okada et al. ............... 425/520
5,494,546 A * 2/1996 Horvath ................... 156/583.3
5,558,015 A * 9/1996 Miyashita et al. ....... 156/583.3
5,562,028 A * 10/1996 Bielfeldt et al. ......... 156/583.3
5,578,159 A * 11/1996 Miyashita et al. ....... 156/583.3
5,593,532 A * 1/1997 Falk et al. ............... 156/583.3
5,725,711 A * 3/1998 Taylor ..................... 156/583.3
5,800,667 A * 9/1998 Kosaki et al. ........... 156/583.3
5,830,518 A * 11/1998 Oda ........................... 425/520
5,840,347 A * 11/1998 Muramatsu et al. ..... 156/583.3

FOREIGN PATENT DOCUMENTS

JP 59-079730 5/1984
JP 61-098529 5/1986
JP 63-180469 7/1988
JP 02-126434 5/1990

OTHER PUBLICATIONS

European Search Report dated Feb. 22, 2002.

* cited by examiner

*Primary Examiner*—James P. Mackey
(74) *Attorney, Agent, or Firm*—TraskBritt

(57) ABSTRACT

Apparatus and method for the use of a remotely actuated localized pressure and heat apparatus for the consolidation and curing of fiber elements in, structures. The apparatus includes members for clamping the desired portion of the fiber elements to be joined, pressure members and/or heat members. The method is directed to the application and use of the apparatus.

45 Claims, 11 Drawing Sheets

REMOTELY ACTUATED LOCALIZED PRESSURE AND HEAT APPARATUS AND METHOD OF USE

GOVERNMENT RIGHTS

This invention is considered to be a subject invention under a subcontract under NASA Cooperative Agreement No. NCC8-115, and the U.S. Government has certain rights in such invention.

BACKGROUND OF THE INVENTION

1. Field of the Invention

The present invention relates to an apparatus and method for the manufacture of fiber reinforced structures. More specifically, the present invention relates to an apparatus and method of use of a remotely actuated, localized pressure and heat apparatus for the consolidation, curing and bonding of fiber elements in structures.

2. State of the Art

It is desirable to have inexpensive, strong, lightweight, easily manufactured components in a variety of sizes and geometries for use in aerospace and aircraft applications. Composite reinforced, or "stiffened", structures, such as shells, fuel tanks, fuselage panels, wing skins, etc., provide recognized advantages in aerospace applications over conventional metal assemblies, typically of aluminum, titanium, or combinations thereof, in terms of relatively lower weight, higher strength, and stiffness for the composite structures. The acceptance of all-composite structures has been hampered by the lack of demonstrated, repeatable, and inexpensive fabrication methodology and apparatus, particularly where a large reinforced composite structure is desired, as a suitable autoclave may not be available for the curing of the fiber elements forming the structure. In simple terms, the structure may be too large for any known existing autoclave for curing or may not be capable of transport to a suitable autoclave for curing. Thus, many such structures are Limited to high-performance, military, and/or aerospace applications, as not being cost-competitive in other applications.

A composite shell structure may require discrete internal or external reinforcing elements or stiffeners and bulkheads, hereinafter referred to generally as "ribs" and "bulkheads," adjacent a continuous shell structure, to provide enhanced stiffness to the shell structure in terms of torsional and bending resistance. The larger the composite shell structure and the greater the stresses and the more severe the operating environment, the greater the need for such reinforcement. Reinforcing elements may be discrete and remote from each other, maybe disposed in a mutually parallel relationship, or may be disposed an intersecting relationship to define the reinforcing required for the composite structure. In some instances, the reinforcement ribs and bulkheads for the structure may be formed in segments and subsequently joined at intersection points to form the reinforcement for the composite structure prior to the formation of the continuous shell therewith. Such is particularly advantageous where the composite structure is large, requiring substantial reinforcement ribs and bulkheads and having complex geometric shapes, either for the ribs and bulkheads or the overall structural shape.

The ribs and bulkheads for the reinforcement of the composite structure are typically formed of "composite fiber elements" or "fiber elements" including carbon fiber impregnated or coated with a curable bonding agent. By way of example and not Limitation, composite fibers may include elongated filaments of glass, graphite, boron, or polyarimid (Kevlar™), as specifications indicate.

While components of the ribs and bulkheads may be formed individually, it is necessary to subsequently assemble the rib and bulkhead components into a completed reinforcing structure for the application of the continuous shell of composite material thereto. To assemble and cure the individual rib and bulkhead components to form the completed reinforcing structure, an apparatus and method is required for the clamping and curing of the fiber elements of the rib and bulkhead components locally, particularly at the joints between adjacent ribs and bulkheads.

SUMMARY OF THE INVENTION

The present invention relates to an apparatus and method for the manufacture of fiber reinforced structures. The present invention is directed to an apparatus and method for the use of a remotely actuated localized pressure and heat tool for the consolidation, curing and bonding of portions of fiber elements in composite structures. The apparatus of the present invention comprises an apparatus including members for clamping the desired portion of the fiber elements to be joined, pressure members, and/or heat members. The method of the present invention is directed to the application and use of the clamping apparatus.

The present invention will be better understood when the drawings are taken in conjunction with the description of the invention hereafter.

DESCRIPTION OF THE INVENTION

Figure 1:
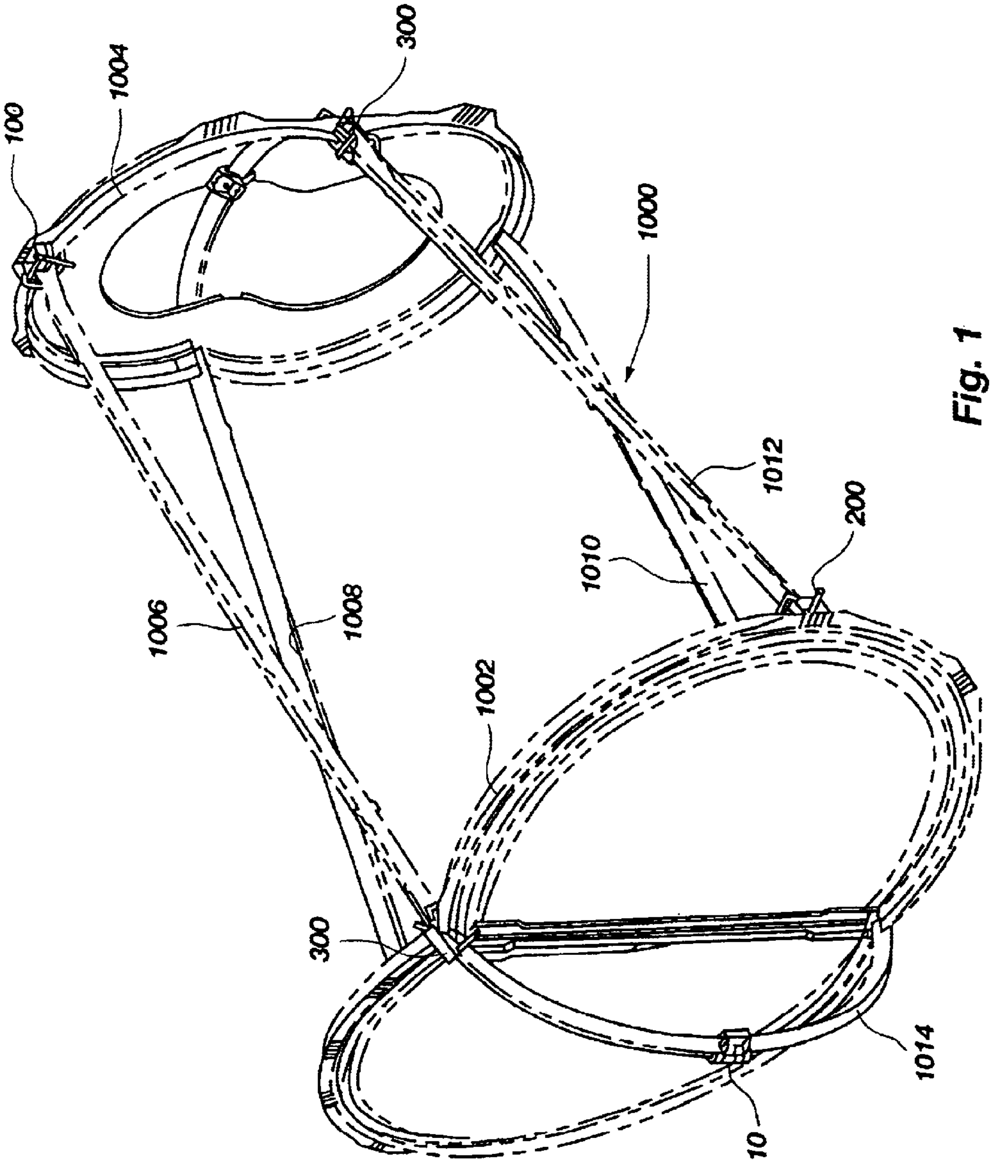
FIG. 1 is an isometric view of a typical reinforcing structure formed using the present invention.

Referring to drawing FIG. 1, a reinforcing structure 1000 for a tank in an aerospace application is illustrated. The reinforcing structure 1000, formed of fiber elements, includes first bulkhead 1002, second bulkhead 1004, and reinforcing ribs 1006, 1008, 1010, 1012, and 1014 interconnecting the bulkheads 1002 and 1004. To form the connections between the bulkheads 1002, 1004 and the ribs 1006, 1008, 1010, 1012, 1014, the apparatus 10 of the present invention is used to apply localized pressure and heat to the uncured portions of the reinforcing structure to consolidate and cure the fiber elements forming such structure 1000. The apparatus 10 of the present invention confines the various portions of the uncured reinforcing structure 1000 during the consolidation and curing of the fiber elements to yield a connection joint having the desired strength and durability.

After the consolidation and curing of fiber elements forming the reinforcing structure 1000, the apparatus 10 is removed therefrom. The apparatus 10 may be used singly to form a single joint between various members of the reinforcing structure 1000 or a plurality may be used to form a plurality of joints simultaneously of the reinforcing structure. Either before or after the consolidation of the joints of the reinforcing structure 1000, the apparatus 10 of the present invention may further be used to consolidate and cure remaining portions of the reinforcing structure 1000 which have not been consolidated or cured. A control system for the operation of the apparatus 10 of the present invention may be provided.

Figure 2:
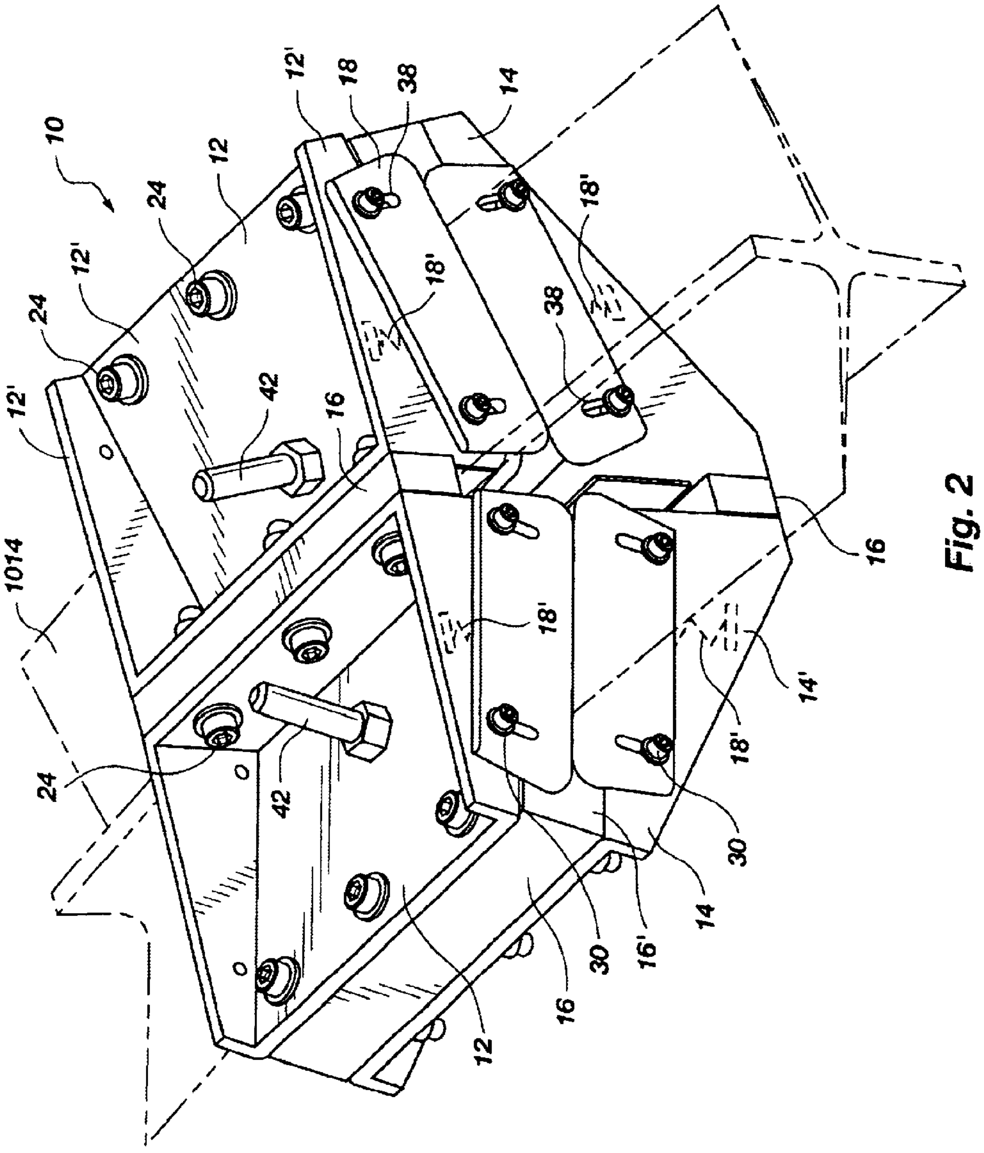
FIG. 2 is an isometric view of a first embodiment of the apparatus of the present invention.

Referring to drawing FIG. 2, the apparatus 10 of the present invention is illustrated in relation to a rib 1014 of the reinforcing structure 1000. The apparatus 10 of the present invention being is configured for the cross-sectional shape of the joint configuration of the portions of ribs to be connected through the consolidation and curing of the fiber elements forming the ribs. The apparatus 10 of the present invention may be formed of any readily available, suitable material for use in the consolidation and curing of the fiber elements of the reinforcing structure 1000; however, preferably the apparatus 10 should be of high strength, lightweight material, such as aluminum, titanium, alloys or combinations thereof, to reduce the weight on the structure 1000. Optionally, the apparatus 10 may require support while installed on the structure 1000. The apparatus 10 includes upper members 12, lower members 14, spacers 16, end members 18, pressure members 20 (not shown), heat members 22 (not shown), and fasteners 24. The upper members 12 may be of any suitable shape and configuration for mating with the rib formed of fiber elements to be consolidated and cured. The upper member 12 may be a fabrication of individual end portions 12 connected by a suitable means, such as welding, threaded fasteners, etc., or may be an integral solid member having a machined configuration. Each upper member 12 is formed having a plurality of apertures 26 therein (not shown) for fasteners 24 to extend therethrough. Individual end portions 12' of the upper member 12 include a plurality of apertures 28 therein (not shown) for fasteners 30 to retain end members 18 thereon. The upper members 12 may be of any convenient suitable size, shape, and configuration for the consolidation and curing of the fiber elements forming the reinforcing structure 1000. The upper members 12 are formed having sufficient strength to retain the loads generated by the pressure members 20 at the desired temperature levels generated by the heat members 22 contained and retained therein. The upper members 12 are spaced from lower members 14 by spacers 16 having a plurality of apertures 32 therein (not shown) for the fasteners 24 to extend therethrough. The spacers may be of any convenient suitable size, shape, and configuration for the consolidation and curing of the fiber elements forming the reinforcing structure 1000, the spacers 16 being sufficiently wide to have a portion on each end 16' thereof covered by end members 18. The lower members 14 are formed similarly to the upper members 12. Each lower member 14 may be a fabrication of individual end portions 14 connected by a suitable means, such as welding, threaded fasteners, etc., or may be an integral solid member having a machined configuration. Each lower member 14 is formed having a plurality of apertures 34 therein (not shown) for fasteners 24 to extend therethrough. Individual end portions 14' of the lower member 14 include a plurality of apertures 36 therein (not shown) for fasteners 30 to retain end members 18 thereon. The lower members 14 may be of any convenient suitable size, shape, and configuration for the consolidation and curing of the fiber elements forming the reinforcing structure 1000. The lower members 14 are formed having sufficient strength to retain the loads at the desired temperature levels generated by the pressure members 20 and heat members 22 contained and retained therein. The lower members 14 are spaced from upper members 12 by spacers 16 having a plurality of apertures 32 therein (not shown) for the fasteners 24 to extend therethrough. Each end member 18 is formed having a plurality of slots 38 therein through which fasteners 30 extend, mating with apertures 28 or 36 in upper member 12 or lower member 14, respectively, to retain the end member 18 thereon to confine the pressure member 20 and heat member 22 within upper member 12 and lower member 14. The end member 18 is adjusted using fasteners 30 and slots 38 to retain the pressure member 20 (not shown) and heat member 22 (not shown) within the upper member 12 or lower member 14 without the end member 18 contacting the portion of the reinforcing structure 1000 upon which the apparatus 10 is installed during the consolidation and curing of the fiber elements forming the structure 1000. Typically, a small gap is maintained, although not required, between the end member 18 and the reinforcing structure 1000. To facilitate the placement of the end members 18 with respect to a portion of the reinforcing member 1000, a spring 18' (shown in broken lines) having one end secured to an upper member 12 or lower member 14 and the other end abutting an end member 18 may be used to bias the member 18 in the desired position. Each upper member 12 and lower member 14 further includes an aperture 40 therein (drawing FIG. 3), which may be threaded, to connect a pressure line 42, connected to a suitable supply of fluid under pressure to supply fluid under pressure to a pressure member 20 (not shown) contained therein. The geometric shape of each upper member 12, lower member 14, spacer 16, and end member 18 is compatible with the portion of the reinforcement structure 1000 upon which it is to be used. As illustrated in drawing FIG. 1, the rib 1014 has a T-shaped cross-sectional configuration with the stem of the T-shape extending above the cross-arms to the T-shape with the apparatus 10 surrounding both the stem and the cross-arms of the T-shape in a localized area of the rib 1014. The end members 18 of the upper member 12 and lower member 14 extend adjacent to, but not in contact with, either the stem portions or the cross-arm portions of the T-shaped rib 1014. The threaded fasteners 24 and 30 may be of any convenient, suitable size and length well known in the industry for use with the upper members 12, lower members 14, and end members 18 in their size, shape, configuration, and loading from pressure members 20 (not shown) and heat members 22 (not shown) for use in consolidation and curing the fiber elements forming rib 1014. The end members 18 may be of any desired shape and configuration suitable for preventing the pressure member 20 from extending beyond the upper member 12 and lower member 14. The end members 18 may be placed on the one or more ends and the sides of the upper member 12 and lower member 14.

Figure 3:
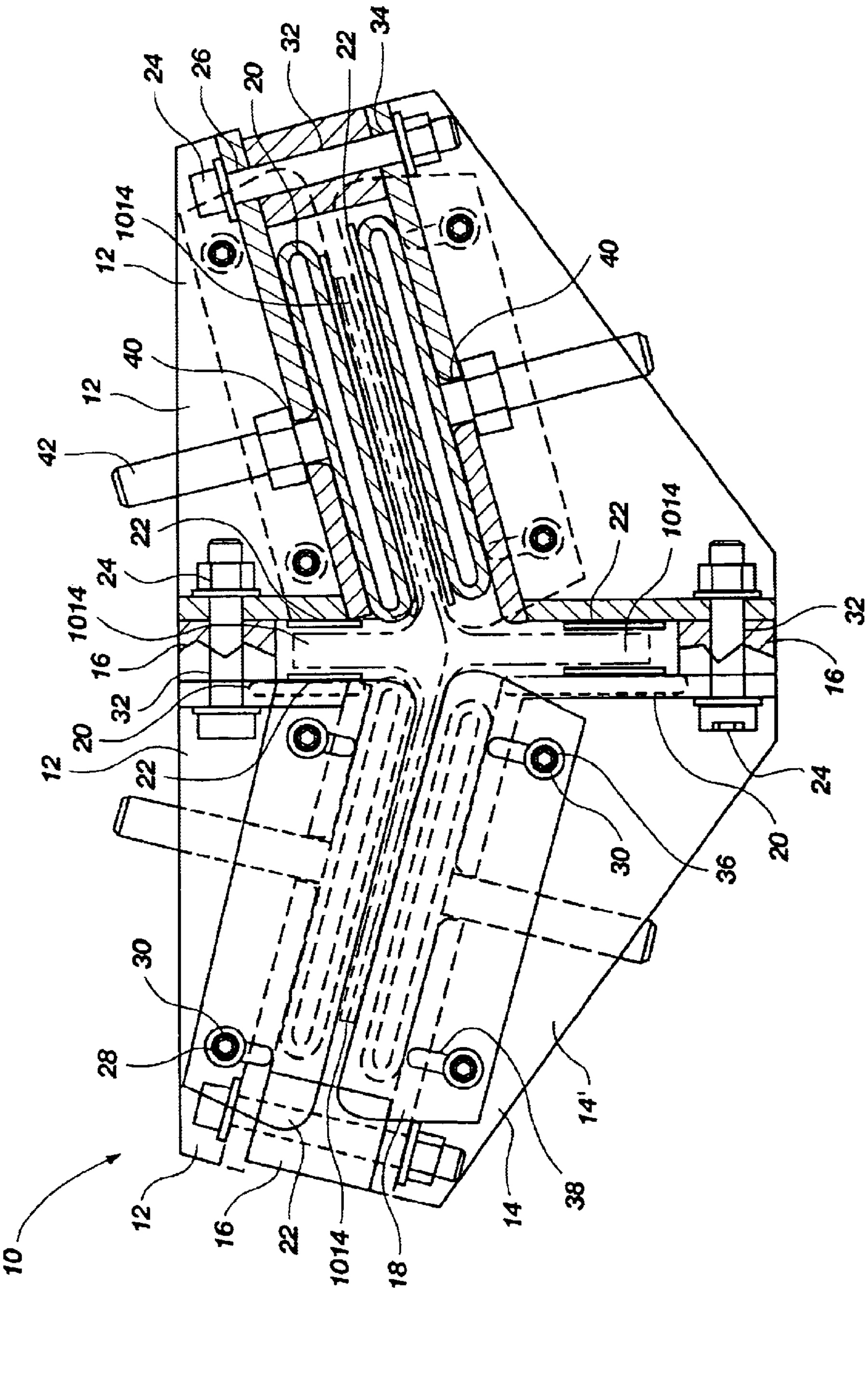
FIG. 3 is a partial cross-sectional end view of the first embodiment of the present invention of drawing FIG. 2.

Referring to drawing FIG. 3, the apparatus 10 illustrated in drawing FIG. 2 is shown in a partial cut-away cross-sectional end view. As illustrated, the pressure members 20 are any suitable inflatable pressure member for use in the consolidation and curing of the fiber elements forming the rib 1014. The pressure members 20 may be any suitable elastomer material or reinforced elastomeric material, such as silicon elastomer, rubber, synthetic rubber, neoprene, and reinforced with nylon, Kevlar™, etc., types of material. The pressure members 20 are preferably thin in construction for the member 20 to be compliant to the shape of the portion of the rib 1014 that it surrounds. Each pressure member 20 is supplied fluid pressure through line 42 connected thereto and extending through apertures 40 in upper member 12 and lower member 14 retained thereby by any suitable manner, such as a threaded connection, welding, etc. The fluid supplied under pressure may be any suitable pressurized fluid which is readily available for use, such as air, nitrogen, etc. It is preferred that the pressure members 20 are used in opposing pairs operating at substantially the same inflation pressure levels to balance the loading on the rib 1014 and the upper member 12 and lower member 14. The heat members 22 may be any well known, commercially available, electrically powered heat members of suitable size and configuration to be contained within upper members 12 and lower members 14 suitable for use in the consolidation and curing of the fiber elements forming rib 1014 or any portion of structure 1000. The heat members 22 include members 22 to both heat the cross-arm portions of the T-shaped rib 1014 as well as heat the stem portions of the T-shaped rib 1014. In this manner, pressure is applied through pressure members 20 while heat is applied through the heat members 22 to consolidate and cure the fiber elements locally. If desired or necessary, pressure members 20 (shown in phantom) may be used to apply additional pressure to the stem portions of the T-shaped rib 1014 during the consolidation and curing process. Illustrated are the apertures 32 in spacer 16 as well as apertures 26 in end members 18, apertures 28 in upper members 12, and apertures 34 in lower members 14. Further illustrated is the relationship between the end members 18 and the cross-arm portions of the T-shaped rib 1014 wherein the end members 18 are located adjacent the cross-arm portions but not in contact therewith during the consolidation and curing process of the fiber elements forming the rib 1014. As it is preferred to balance the pressure loads on the rib 1014 during consolidation and curing of the fiber elements, it is preferred that the pressure members 20 be actuated substantially simultaneously at substantially the same inflation pressure level and the heat members 22 be actuated substantially simultaneously for uniform loading of the rib 1014 for the application of pressure and heating thereto.

Figure 4:
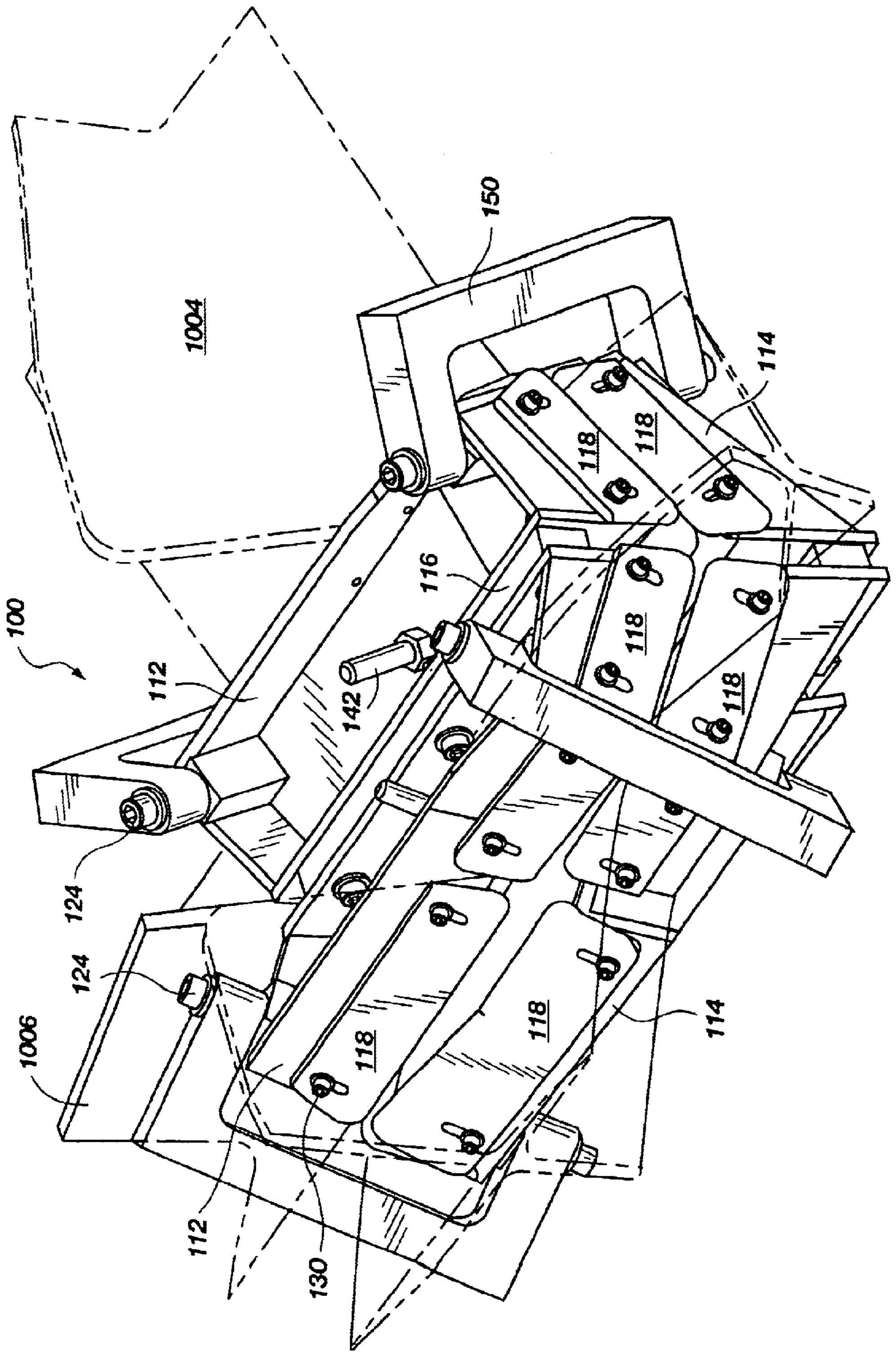
FIG. 4 is an isometric view of a second embodiment of the apparatus of the present invention.

Referring to drawing FIG. 4, a second embodiment 100 of the apparatus of the present invention is shown. The apparatus 100 is typically used to connect a rib 1006 to a bulkhead 1004. The apparatus 100 is generally similar to the previously described apparatus 10 including upper members 112, lower members 114, spacers 116, end members 118, and fasteners 124, 130. The apparatus 100 further includes a plurality of C-shaped clamps 150 extending between upper members 112 and lower members 114 to retain the members on the rib 1006 and bulkhead 1004 in position for the consolidation and curing or bonding of the fiber elements. In apparatus 100, the C-shaped clamps 150 are installed at the outer corners of the upper members 112 and lower members 114 and retained or fastened thereto by fasteners 124. Each upper member 112 and lower member 114 further includes end members 118 on the front and rear ends thereof and on the outer sides thereof to contain the pressure members 120 (not shown) therein during the consolidation and curing of portions of the fiber elements of the rib 1006 and bulkhead 1004. The C-shaped clamp members 150 are used in the place of a plurality of fasteners, such as fasteners 24 in drawing FIGS. 2 and 3, to retain the upper members 112 and lower members 114 in position on the rib 1006 and bulkhead 1004. The C-shaped clamps 150 may be of any desired shape and of any desired material having sufficient strength for the loading of the upper members 112 and lower members 114 by the pressure members 120 (not shown) and provide access for the portions of the fiber elements of the ribs and bulkheads of the structure 1000 to be consolidated and cured. However, it is preferred that the apparatus 100 be of strong, lightweight material for ready handling and use.

Figure 5:
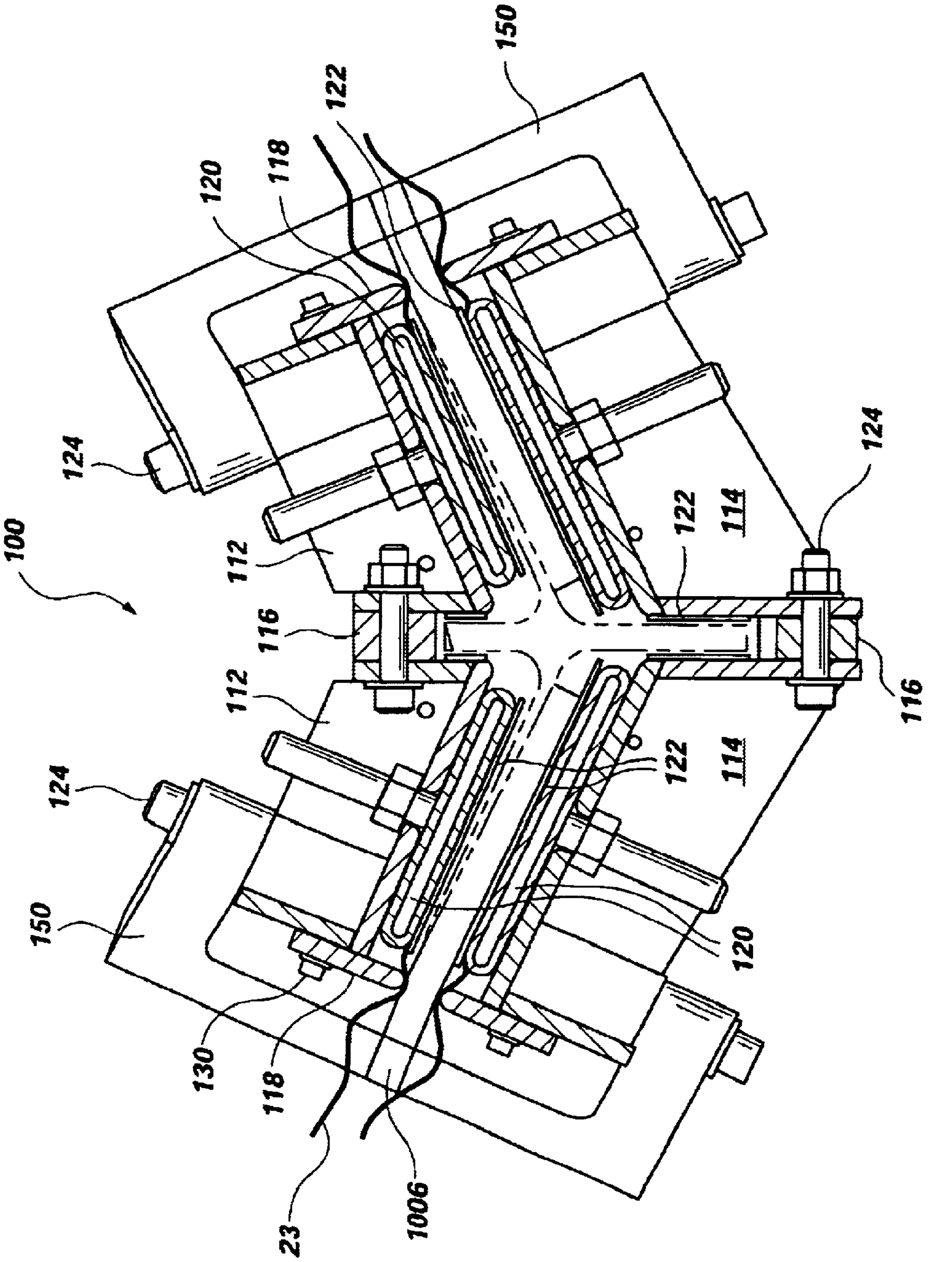
FIG. 5 is a partial cross-sectional end view of the second embodiment of the present invention of drawing FIG. 4.

Referring to drawing FIG. 5, the apparatus 100 is shown in a partial cut-away cross-sectional view. As shown, the end members 118 are located on the ends and sides of the upper members 112 having inlets 142 thereto and lower members 114 having pressure members 120 and heat members 122 contained therebetween. As illustrated, the heat members 122 contain electrical wiring and connections 23 to supply power thereto for the heating of the members 122. The apparatus 100 further includes spacers 116 between the individual upper members 112 and the individual lower members 114, but not between upper members 112 and lower members 114 due to the configuration of the rib 1006 and bulkhead 1004 to be connected.

Figure 6:
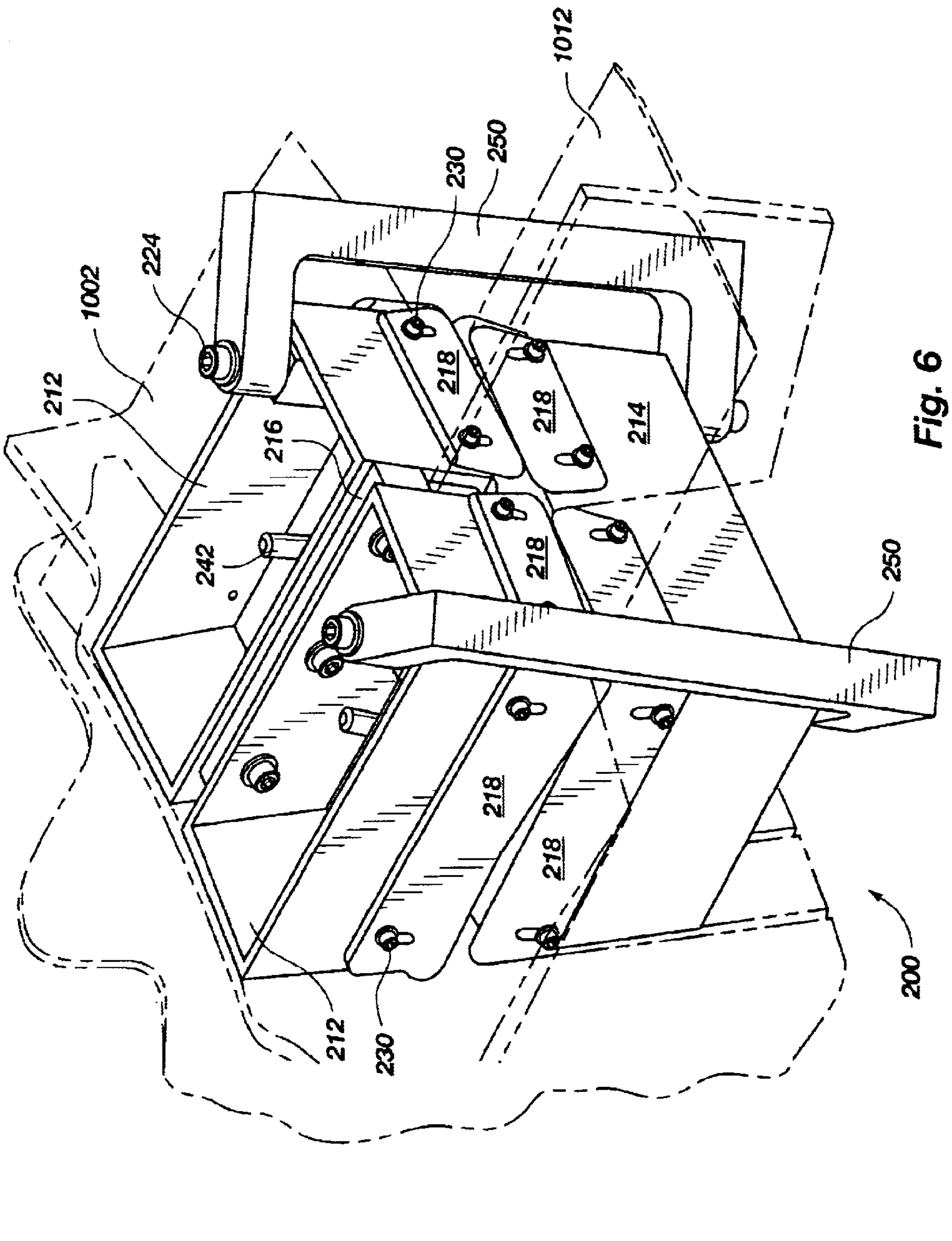
FIG. 6 is an isometric view of a third embodiment of the apparatus of the present invention.

Referring to drawing FIG. 6, a third embodiment of the apparatus 200 of the present invention is illustrated. As shown, the apparatus 200 includes upper members 212, a lower member 214, a spacer 216, end members 218 on the one end of upper members 212 and sides thereof and the one end of lower member 214 and the sides thereof for the consolidation and curing of portions of the fiber elements of rib 1012 and bulkhead 1002, pressure members 220 (not shown) having inlets 242 located between upper members 212 and lower member 214 as described hereinbefore, and heat members 222 (not shown) located between upper members 212 and lower member 214 as described hereinbefore. In apparatus 200 of the present invention, a single lower member 214 is used, rather than a plurality of lower members as described hereinbefore. The use of a single lower member 214 accommodates the differing geometry of the end of the rib 1012 to be joined to the bulkhead. 1002. As further illustrated, only two C-shaped clamps 250 secured by fasteners 224 are used to retain the upper members 212 to the lower member 214 during the consolidation and curing of the fiber elements of rib 1012 and bulkhead 1002, the clamps having sufficient strength for the process. As previously described, the end members 218 having fasteners 230 confine the pressure members 220 (not shown) and heat members 222 (not shown) between the upper members 212 and lower member 214. Only a single spacer 216 is used in the apparatus 200 to separate the upper members 212 from each other for a portion of the rib 1012 to extend therebetween.

Figure 7:
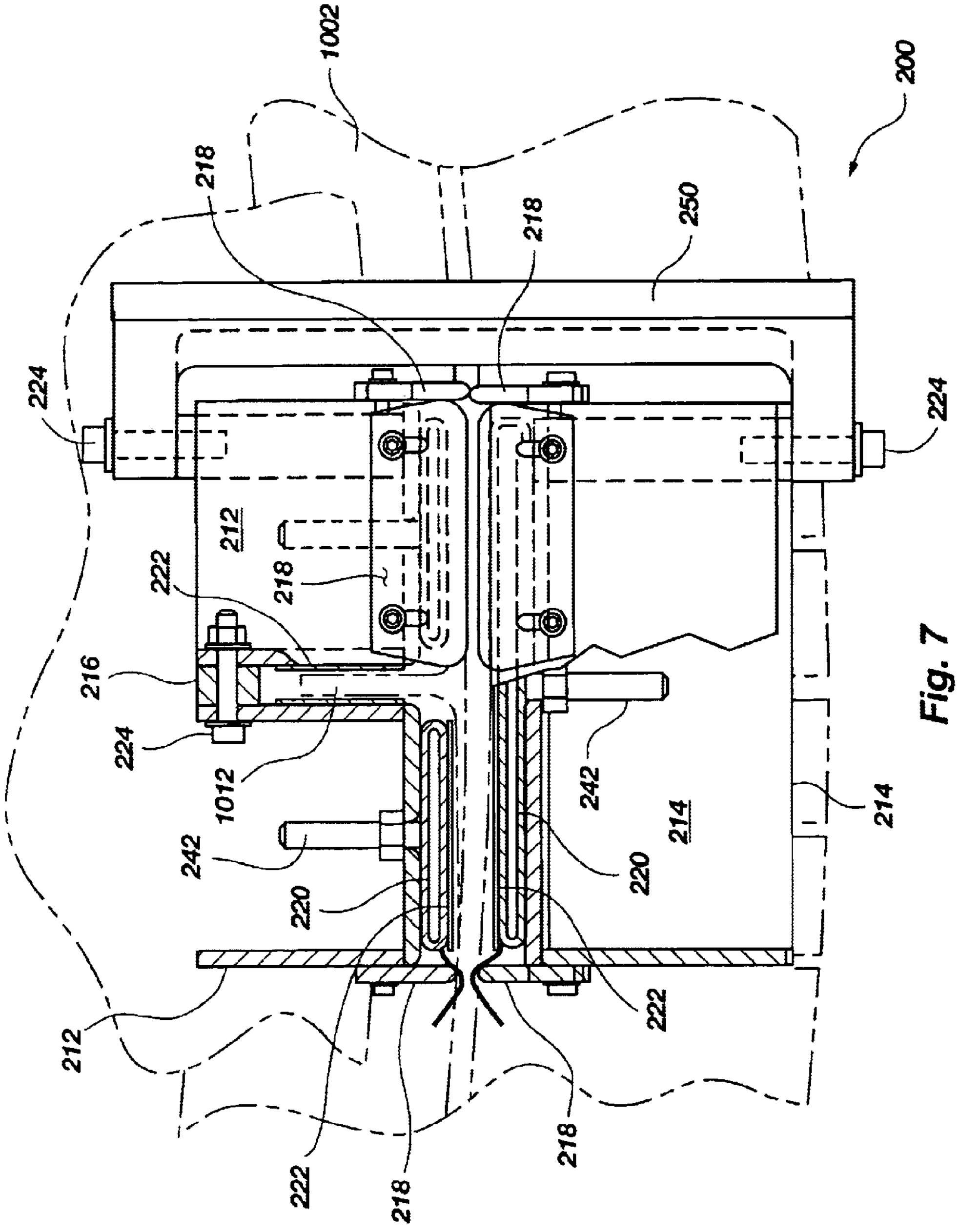
FIG. 7 is a partial cross-sectional front end view of the third embodiment of the apparatus of the present invention.

Referring to drawing FIG. 7, the apparatus illustrated in drawing FIG. 6 is shown in a partial cross-sectional view. Illustrated are the upper members 212, lower member 214, spacer 216, end members 218 on the ends and sides of the members 212 and 214, pressure members 220 having inlets 242, heat members 222, and C-shaped clamp 250 secured by fasteners 224 in relation to the rib 1012 and bulkhead 1002. As shown, the spacer 216 extends between upper members 212 while lower member 214 is connected thereto by C-shaped clamp 250.

Figure 8:
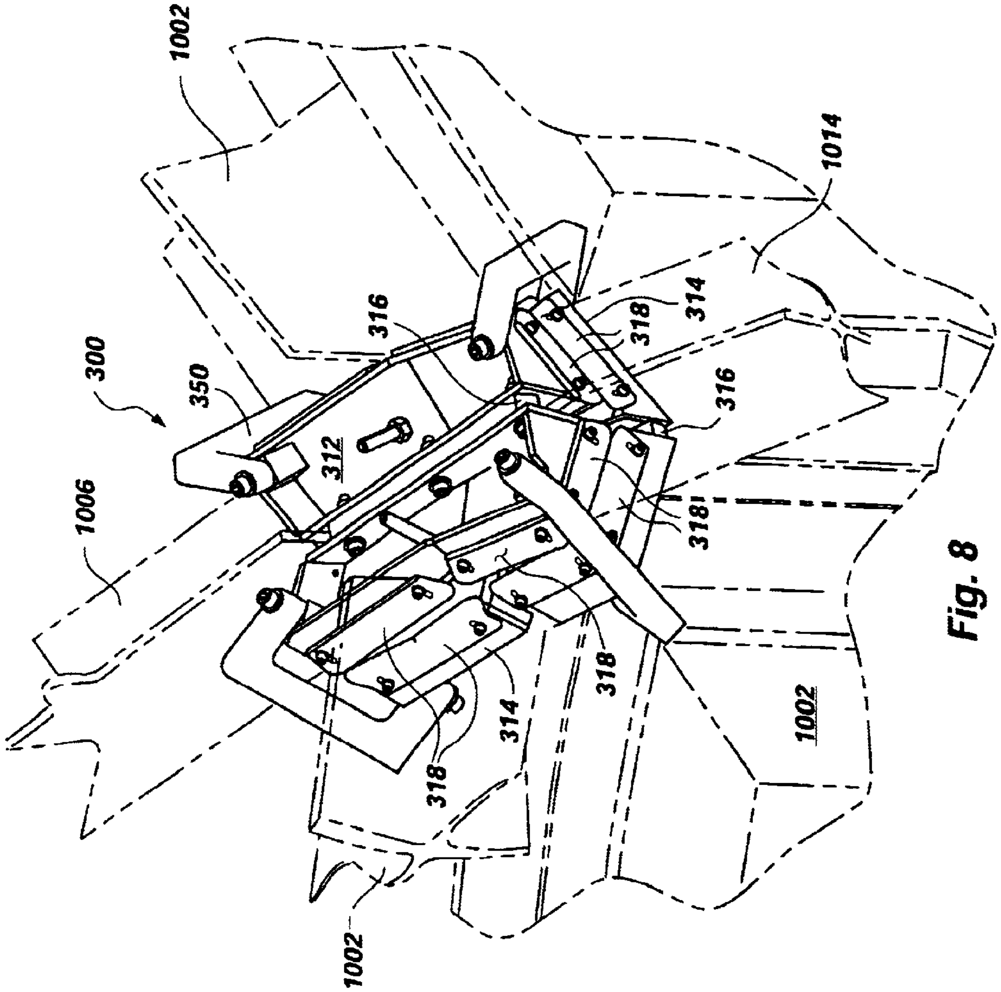
FIG. 8 is an isometric view of a fourth embodiment of the apparatus of the present invention.

Referring to drawing FIG. 8, a fourth embodiment 300 of the apparatus of the present invention is illustrated. The apparatus 300 includes upper members 312, lower members 314, spacers 316, end members 318 secured by fasteners 330, and C-shaped clamps 350 secured by fasteners 324. The upper members 312 and lower members 314 are clamping and retaining a rib 1006, rib 1014, and various portions of bulkhead 1002 during the consolidation and curing of portions of the fiber elements from which such are formed. The upper members 312 and lower members 314 are formed at differing angles to accommodate the ribs 1006, 1014 and portions of bulkhead 1002 and held in position by the C-shaped clamps 350.

Figure 9:
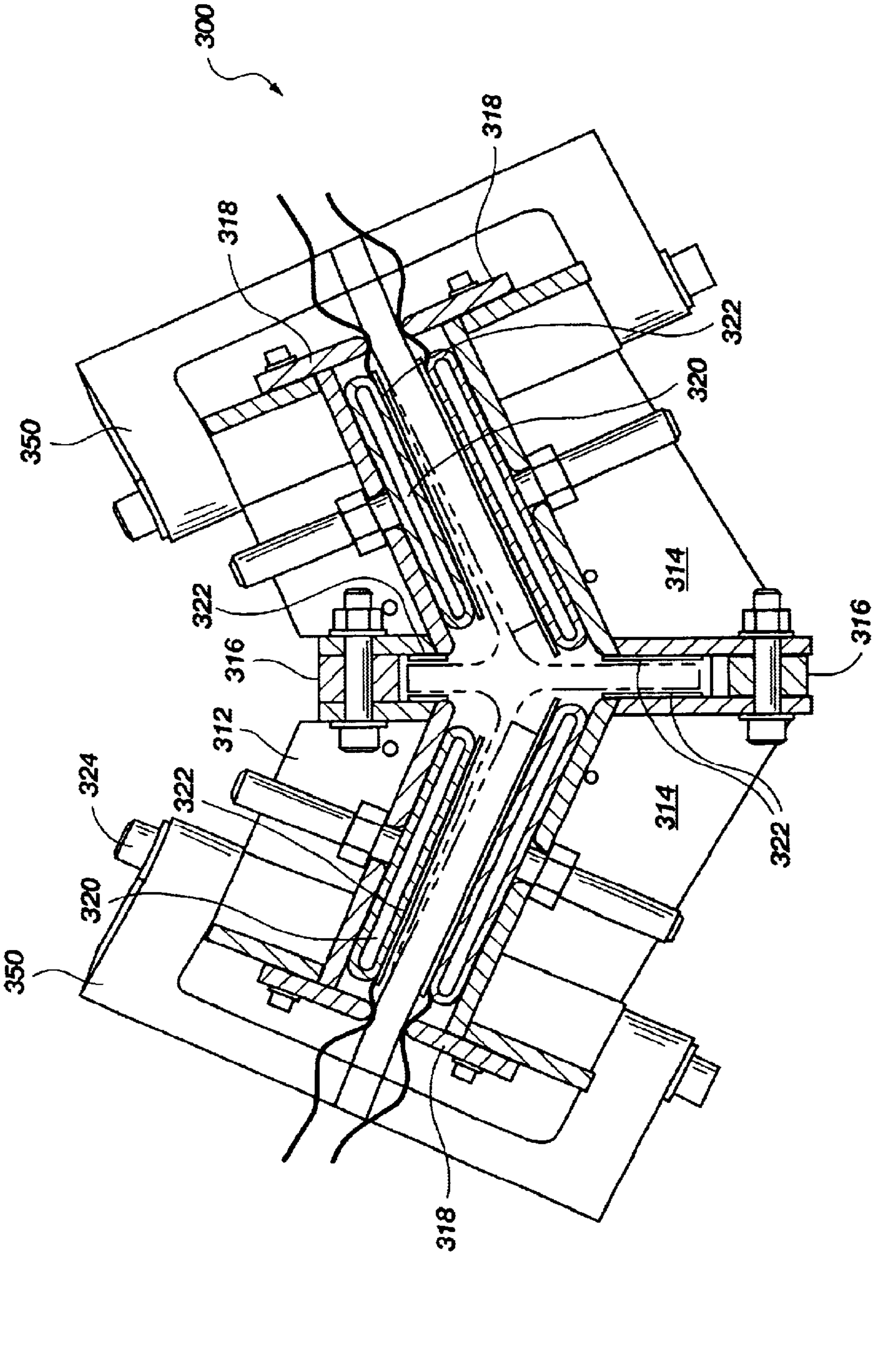
FIG. 9 is a cross-sectional view of the fourth embodiment of the apparatus of the present invention.

Referring to drawing FIG. 9, the apparatus 300 is illustrated in cross-section to show the relationship between the upper members 312, lower members 314, spacers 316, end members 318 on the ends and sides of the members 312, 314, pressure members 320, and heat members 322. The pressure members 320 and heat members 322 are placed to apply pressure and heat to the fiber elements during the consolidation and curing thereof as illustrated.

Figure 10:
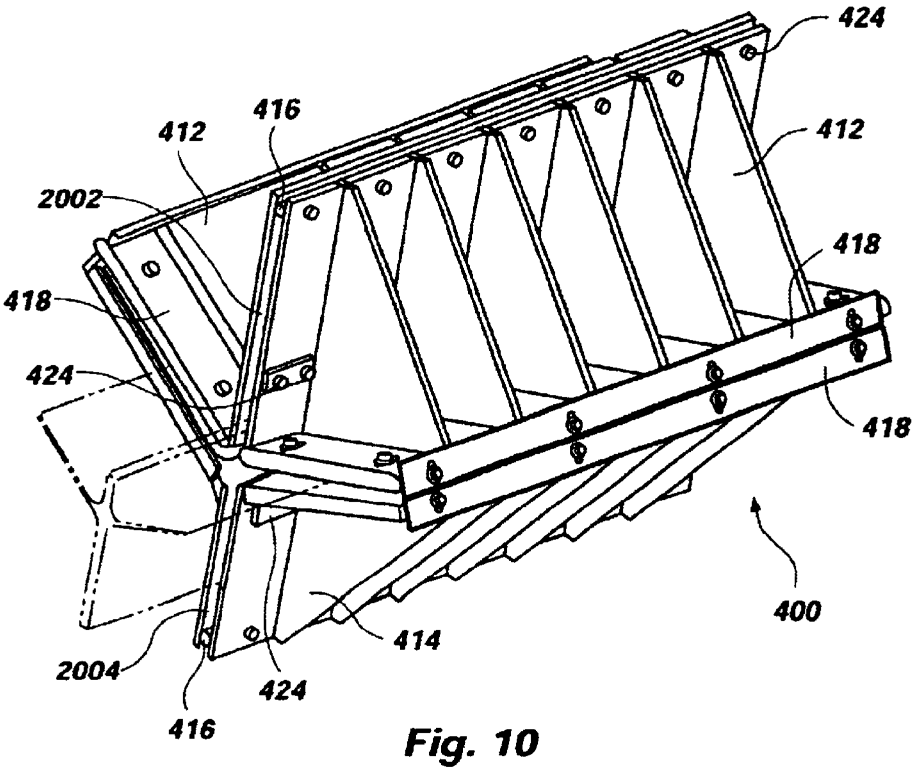
FIG. 10 is an isometric view of a fifth embodiment of the apparatus of the present invention.

Referring to drawing FIG. 10, a fifth embodiment 400 of the apparatus of the present invention is illustrated. The apparatus 400 includes upper members 412, lower members 414, spacers 416, and end members 418 having fasteners 430, the upper members being secured together by fasteners 424 and the lower members being secured together by fasteners 424. The upper members 412 and lower members 414 are additionally secured by fasteners 424 to portions of ribs 2002 and 2004 used as a supporting member for the upper member 412 and lower member 414 during use. In this manner, the upper members 412 are secured to each other and to rib 2002 while the lower members 414 are similarly secured to a portion of rib 2004. By using portions of the ribs 2002 and 2004 as a support element for the upper members 412 and lower members 414, it is not necessary that the members 412 and 414, be secured to each other.

Figure 11:
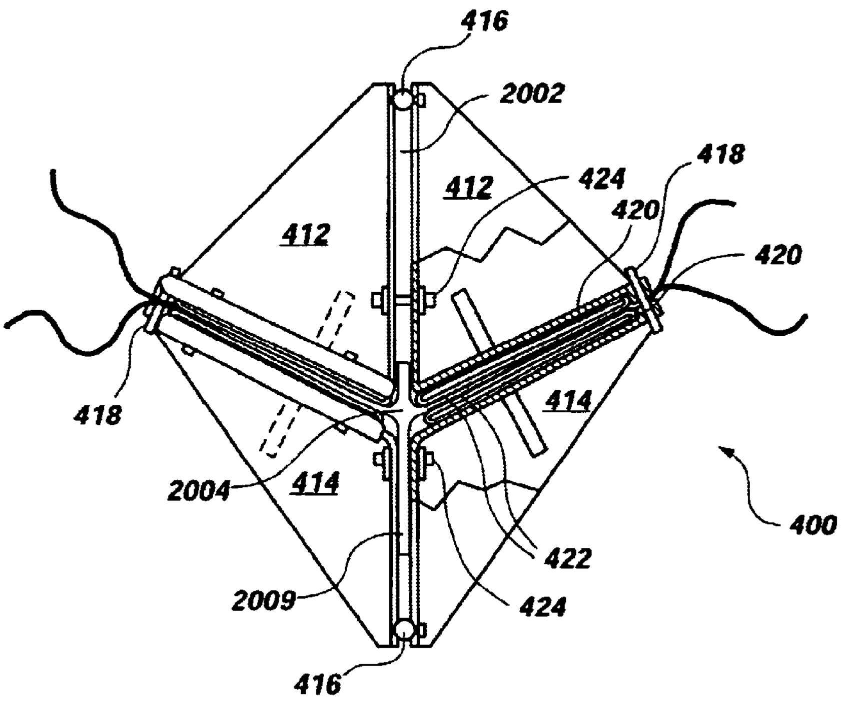
FIG. 11 is a partial cross-sectional view of the fifth embodiment of the present invention.

Referring to drawing FIG. 11, the apparatus 400 is illustrated showing the relationship between the upper members 412 and rib 2002, lower members 414 and rib 2004, spacers 416, end members 418 having fasteners 430 (drawing FIG. 10) on the ends and sides of members 412, 414, pressure members 420 having inlets 442, and heat members 422, the apparatus 400 operating in a similar manner to those described hereinbefore except for portions of the ribs 2002 and 2004 being used as support for the apparatus 400.

Figure 12:
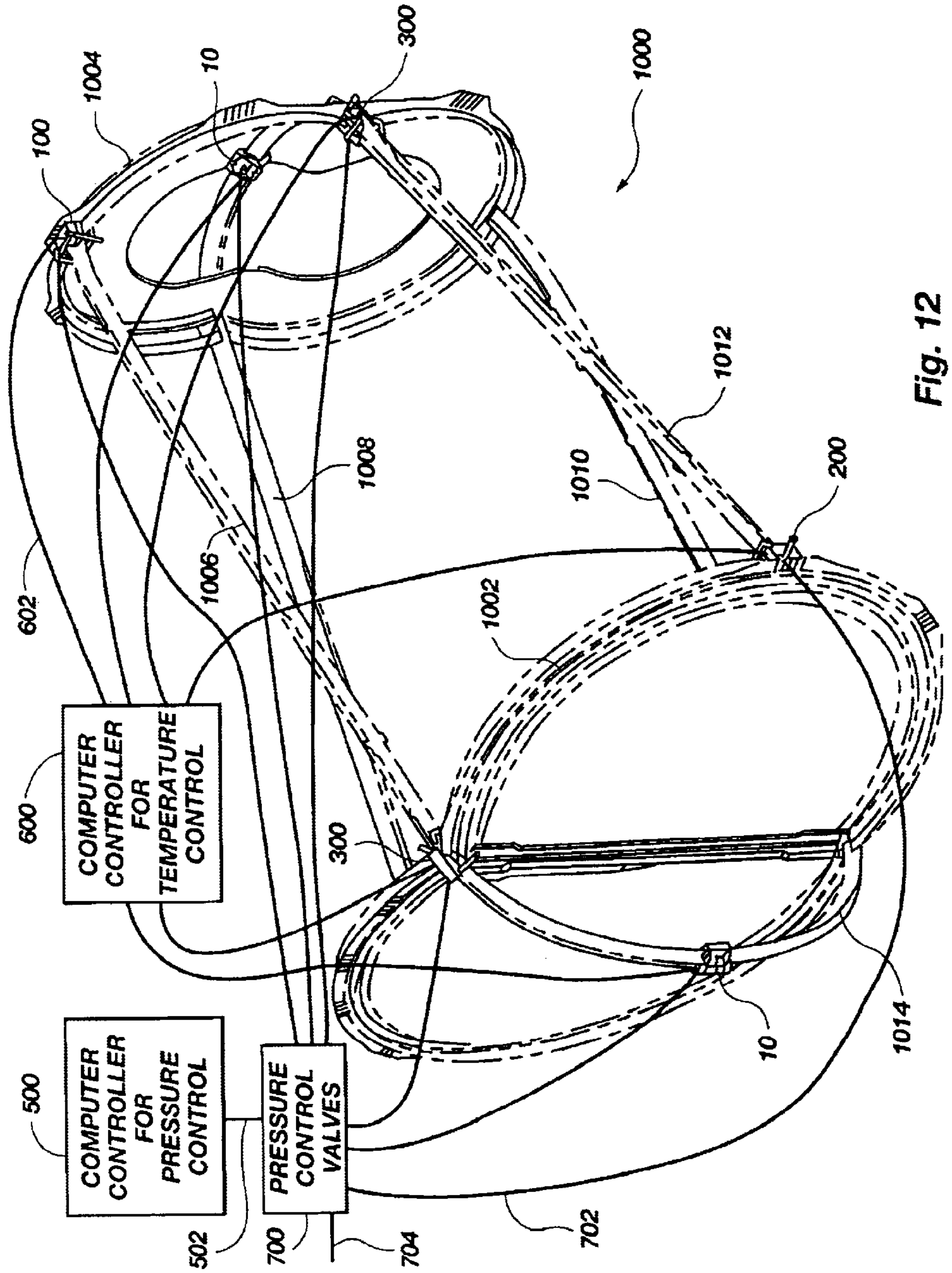
FIG. 12 is an isometric view of the present invention and the control apparatus therefor in relation to a reinforcing structure of ribs and bulkheads.

Referring to drawing FIG. 12, a computer controller 500 for the control of pressure to the pressure members of the apparatus of the present invention is illustrated along with a computer controller 600 for the control of the heat members of the apparatus of the present invention. As illustrated, the computer controller 500 is connected via connection 502 to pressure control valves 700 which are, in turn, connected to individual apparatus 10 of the present invention to control the pressure members 20 (not shown) therein. Fluid pressure is supplied to valves 700 via line 704 and is conveyed to each apparatus 10 by lines 702. The computer controller 600 is connected via lines 602 to the heat members 22 (not shown) of each apparatus 10 to control the heating and cooling thereof during the consolidation and curing of portions of the fiber elements of the ribs and bulkheads. Any desired pressure in any desired schedule of application of pressure may be supplied to the pressure members 20 of the apparatus 10, such as in the range typically of fifty (50) pounds per square inch to eighty (80) pounds per square inch, although more or less may be used as required. Any desired temperature in any desired schedule of the application of temperature may be used to cure the portions of fiber elements as required by the coating thereon using the heat members 22 in the apparatus 10. The computer controllers 500 and 600 control the desired application of pressure and temperature. The pressure control valves actuated by the computer controller 500 may be of any suitable, convenient, commercially available type. Similarly, the computer controllers 500 and 600 may be any suitable, convenient, commercially digital computer readily programmed to the desired control function. If desired, only a single computer controller may be used to control both the pressure of the pressure members 20 and heat members 22. Further, if desired, the apparatus of the present invention may be designed to contain only pressure members 20 therein with the structure 1000 being placed in an autoclave to provide the heat during the consolidation and curing of the portions of the fiber elements forming the structure 1000, the apparatus and method of the present invention being directed to the consolidation and curing and/or bonding of fiber elements of composite structures.

It will be apparent to those of skill in the art that changes, revisions, additions, and deletions may be made to the present invention, such as having apparatus of differing shapes or configurations, more or less pressure members and heat members, etc. Such are intended to be within the scope of the claimed invention.

What is claimed is:

1. An apparatus and at least a portion of at least one of a first reinforced structure and a second reinforced structure, each of the first reinforced structure and the second reinforced structure having uncured fiber elements therein and cured fiber elements therein, the apparatus and at least a portion of at least one of a portion of the first reinforced structure and a portion of the second reinforced structure comprising:

a structure having an uncured fiber reinforced structure having fiber elements therein and a cured fiber reinforced structure having fiber elements therein;

an upper member having at least a portion thereof contacting at least a portion of the structure consolidating and curing the fiber elements of a portion of an uncured fiber reinforced structure, the upper member including a pressure member and at least one end member providing localized pressure consolidating and curing and bonding of the uncured fiber elements of an uncured fiber reinforced structure; and a lower member having at least a portion thereof contacting at least a portion of the structure consolidating and curing the fiber elements of a portion of an uncured fiber reinforced structure, the lower member including a pressure member and at least one end member providing localized pressure consolidating and curing and bonding of the uncured fiber elements of an uncured fiber reinforced structure.

2. The apparatus and a portion of the uncured fiber reinforced structure having uncured fiber elements therein of claim 1, wherein:

the upper member further includes a heat member providing localized heat in consolidating and curing and bonding of the uncured fiber elements of a portion of the uncured fiber reinforced structure; and the lower member further includes a heat member providing localized heat in consolidating and curing and bonding of the uncured fiber elements of a portion of the uncured fiber reinforced structure.

3. The apparatus and a portion of the uncured fiber reinforced structure having uncured fiber elements therein of claim 1, wherein the upper member includes a plurality of upper members providing localized pressure in consolidating and curing and bonding of the uncured fiber elements of a portion of the uncured fiber reinforced structure.

4. The apparatus and a portion of the uncured fiber reinforced structure having uncured fiber elements therein of claim 3, wherein the lower member includes a plurality of lower members providing localized pressure in consolidating and curing and bonding of the uncured fiber elements of a portion of the uncured fiber reinforced structure.

5. The apparatus and a portion of the uncured fiber reinforced structure having uncured fiber elements therein of claim 3, wherein the upper members of the plurality are spaced from each other by a spacer in consolidating and curing and bonding of the uncured fiber elements of a portion of the uncured fiber reinforced structure.

6. The apparatus and a portion of the uncured fiber reinforced structure having uncured fiber elements therein of claim 4, wherein the lower members of the plurality are spaced from each other by a spacer in consolidating and curing and bonding of the uncured fiber elements of a portion of the uncured fiber reinforced structure.

7. The apparatus and a portion of the uncured fiber reinforced structure having uncured fiber elements therein of claim 3, wherein each upper member of the plurality of upper members includes at least one end member thereon providing localized pressure in consolidating and curing and bonding of the uncured fiber elements of a portion of the uncured fiber reinforced structure.

8. The apparatus and a portion of the uncured fiber reinforced structure having uncured fiber elements therein of claim 7, wherein at least one upper member of the plurality of upper members includes a plurality of end members thereon providing localized pressure in consolidating and curing and bonding of the uncured fiber elements of a portion of the uncured fiber reinforced structure.

9. The apparatus and a portion of the uncured fiber reinforced structure having uncured fiber elements therein of claim 8, wherein at least one upper member of the plurality of upper members includes an end member on an end thereof and a side thereof.

10. The apparatus and a portion of the uncured fiber reinforced structure having uncured fiber elements therein of claim 4, wherein each lower member of the plurality of lower members includes at least one end member thereon providing localized pressure in consolidating and curing and bonding of the uncured fiber elements of a portion of the uncured fiber reinforced structure.

11. The apparatus and a portion of an uncured fiber reinforced structure having uncured fiber elements therein of claim 10, wherein at least one lower member of the plurality of lower members includes a plurality of end members thereon providing localized pressure in consolidating and curing and bonding of the uncured fiber elements of a portion of the uncured fiber reinforced structure.

12. The apparatus and a portion of the uncured fiber reinforced structure having uncured fiber elements therein of claim 11, wherein at least one lower member of the plurality of lower members includes an end member on an end thereof and a side thereof.

13. The apparatus and a portion of the uncured fiber reinforced structure having uncured fiber elements therein of claim 3, wherein each upper member of the plurality of upper members includes a pressure member therewith providing localized pressure in consolidating and curing and bonding of the uncured fiber elements of a portion of the uncured fiber reinforced structure.

14. The apparatus and a portion of the uncured fiber reinforced structure having uncured fiber elements therein of claim 4, wherein each lower member of the plurality of lower members includes a pressure member therewith providing localized pressure in consolidating and curing and bonding of the uncured fiber elements of a portion of the uncured fiber reinforced structure.

15. The apparatus and a portion of the uncured fiber reinforced structure having uncured fiber elements therein of claim 3, wherein each upper member of the plurality of upper members includes at least one heat member therewith providing localized heat in consolidating and curing and bonding of the uncured fiber elements of a portion of the uncured fiber reinforced structure.

16. The apparatus and a portion of the uncured fiber reinforced structure having uncured fiber elements therein of claim 2, wherein each upper member of the plurality of upper members includes a plurality of heat members therewith.

17. The apparatus and a portion of the uncured fiber reinforced structure having uncured fiber elements therein of claim 4, wherein each lower member of the plurality of lower members includes at least one heat member therewith providing localized heat in the consolidating and curing and bonding of the uncured fiber elements of a portion of the uncured fiber reinforced structure.

18. The apparatus and a portion of the uncured fiber reinforced structure having uncured fiber elements therein of claim 4, wherein each lower member of the plurality of lower members includes a plurality of heat members therewith.

19. The apparatus and a portion of the uncured fiber reinforced structure having uncured fiber elements therein of claim 1, wherein a clamp secures the upper member to the lower member.

20. The apparatus and a portion of the uncured fiber reinforced structure having uncured fiber elements therein of claim 1, wherein a plurality of clamps secures the upper member to the lower member.

21. The apparatus and a portion of the uncured fiber reinforced structure having uncured fiber elements therein of claim 1, wherein at least one fastener secures the upper member to the lower member in consolidating and curing and bonding of the uncured fiber elements of a portion of the uncured fiber reinforced structure.

22. The apparatus and a portion of the uncured fiber reinforced structure having uncured fiber elements therein of claim 1, wherein one of the upper member and the lower member is secured to the portion of the uncured fiber reinforced structure.

23. The apparatus and a portion of the uncured fiber reinforced structure having uncured fiber elements therein of claim 1, wherein the upper member and the lower member are secured to a portion of the portion of the uncured fiber reinforced structure.

24. The apparatus and a portion of the uncured fiber reinforced structure having uncured fiber elements therein of claim 22, wherein a fastener is used to secure one of the upper member and the lower member to the portion of the uncured fiber reinforced structure.

25. The apparatus and a portion of the uncured fiber reinforced structure having uncured fiber elements therein of claim 1, wherein the pressure member includes an inflatable member providing localized pressure in consolidating and curing and bonding of the uncured fiber elements of a portion of the uncured fiber reinforced structure.

26. The apparatus and a portion of the uncured fiber reinforced structure having uncured fiber elements therein of claim 2, wherein each heat member includes an electrical heat member providing localized heat in consolidating and curing and bonding of the uncured fiber elements of a portion of the uncured fiber reinforced structure.

27. The apparatus and a portion of the uncured fiber reinforced structure having uncured fiber elements therein of claim 1, wherein the at least one end member of the upper member is movable with respect to the upper member in consolidating and curing and bonding of the uncured fiber elements of a portion of the uncured fiber reinforced structure.

28. The apparatus and a portion of the uncured fiber reinforced structure having uncured fiber elements therein of claim 27, wherein the at least one end member includes at least one slot therein having a fastener extending therethrough, the fastener having a portion thereof secured to the upper member when consolidating and curing and bonding of the uncured fiber elements of a portion of the uncured fiber reinforced structure.

29. The apparatus and a portion of the uncured fiber reinforced structure having uncured fiber elements therein of claim 1, wherein the at least one end member of the upper member is resiliently biased on the upper member in consolidating and curing and bonding of the uncured fiber elements of a portion of the uncured fiber reinforced structure.

30. The apparatus and a portion of the uncured fiber reinforced structure having uncured fiber elements therein of claim 1, wherein the at least one end member of the lower member is movable with respect to the lower member in consolidating and curing and bonding of the uncured fiber elements of a portion of the uncured fiber reinforced structure.

31. The apparatus and a portion of the uncured fiber reinforced structure having uncured fiber elements therein of claim 30, wherein the at least one end member includes at least one slot therein having a fastener extending therethrough, the fastener having a portion thereof secured to the lower member in consolidating and curing and bonding of the uncured fiber elements of a portion of the uncured fiber reinforced structure.

32. The apparatus and a portion of the uncured fiber reinforced structure having uncured fiber elements therein of claim 1, wherein the at least one end member of the lower member is resiliently biased on the upper member in consolidating and curing and bonding of the uncured fiber elements of a portion of the uncured fiber reinforced structure.

33. The apparatus and a portion of the uncured fiber reinforced structure having uncured fiber elements therein of claim 1, further including:

a pressure control valve for control of pressure to the pressure member of one of the upper member and the lower member in consolidating and curing and bonding of the uncured fiber elements of a portion of the uncured fiber reinforced structure; and computer apparatus for control of the pressure control valve in consolidating and curing and bonding of the uncured fiber elements of a portion of the uncured fiber reinforced structure.

34. The apparatus and a portion of the uncured fiber reinforced structure having uncured fiber elements therein of claim 2, further including:

computer apparatus for control of temperature of the heat member of one of the upper member and the lower member in consolidating and curing and bonding of the uncured fiber elements of a portion of the uncured fiber reinforced structure.

35. The apparatus and a portion of the uncured fiber reinforced structure having uncured fiber elements therein of claim 2, further including:

a pressure control valve for control of pressure to a pressure member of one of the upper member and the lower member in consolidating and curing and bonding of the uncured fiber elements of a portion of the uncured fiber reinforced structure; and a computer apparatus to control the pressure control valve of the one of the upper member and the lower member and temperature of one of the heat members in consolidating and curing and bonding of the uncured fiber elements of a portion of the uncured fiber reinforced structure.

36. The apparatus and a portion of the uncured fiber reinforced structure having uncured fiber elements therein of claim 1, further including:

a pressure control valve for control of pressure to the pressure members of the upper member and the lower member in consolidating and curing and bonding of the uncured fiber elements of a portion of the uncured fiber reinforced structure; and computer apparatus for control of the pressure control valve in consolidating and curing and bonding of the uncured fiber elements of a portion of the uncured fiber reinforced structure.

37. The apparatus and a portion of an uncured fiber reinforced structure having uncured fiber elements therein of claim 2, further including:

computer apparatus for the control of temperature of the heat members of the upper member and the lower member in consolidating and curing and bonding of the uncured fiber elements of a portion of the uncured fiber reinforced structure.

38. An apparatus and a portion of a reinforced structure having a cured portion and an uncured portion having uncured fiber elements therein, the apparatus locally securing at least one of at least a portion of the reinforced structure, the apparatus and the reinforced structure comprising:

a structure having a portion thereof having an uncured fiber reinforced structure having fiber elements therein and having another portion thereof having cured fiber reinforced structure having fiber elements therein;

an upper member including a pressure member and at least one end member consolidating and curing and bonding the uncured fiber elements of a portion of the uncured fiber reinforced structure; and a lower member including a pressure member and at least one end member consolidating and curing and bonding the uncured fiber elements of a portion of the uncured fiber reinforced structure.

39. The apparatus and a portion of a fiber reinforced structure having uncured fiber elements therein of claim 38, wherein:

the upper member further includes a heat member providing localized heat consolidating and curing and bonding the uncured fiber elements of a portion of the uncured fiber reinforced structure; and the lower member further includes a heat member providing localized heat consolidating and curing and bonding the uncured fiber elements of a portion of the uncured fiber reinforced structure.

40. The apparatus and a portion of a fiber reinforced structure having uncured fiber elements therein of claim 38, wherein the upper member includes a plurality of upper members consolidating and curing and bonding the uncured fiber elements of a portion of the uncured fiber reinforced structure.

41. The apparatus and a portion of a fiber reinforced structure having uncured fiber elements therein of claim 40, wherein the lower member includes a plurality of lower members consolidating and curing and bonding the uncured fiber elements of a portion of the uncured fiber reinforced structure.

42. The apparatus and a portion of a fiber reinforced structure having uncured fiber elements therein of claim 40, wherein the upper members of the plurality are spaced from each other by a spacer consolidating and curing and bonding the uncured fiber elements of a portion of the uncured fiber reinforced structure.

43. The apparatus and a portion of a fiber reinforced structure having uncured fiber elements therein of claim 41, wherein the lower member includes a plurality of lower members that are spaced from each other by a spacer consolidating and curing and bonding the uncured fiber elements of a portion of the uncured fiber reinforced structure.

44. The apparatus and a portion of a fiber reinforced structure having uncured fiber elements therein of claim 43, wherein each lower member of the plurality of upper members and plurality of lower members includes at least one end member thereon consolidating and curing and bonding the uncured fiber elements of a portion of the uncured fiber reinforced structure.

45. The apparatus and a portion of a fiber reinforced structure having uncured fiber elements therein of claim 39, further including:

computer apparatus for control of temperature of the heat member of the upper member and the heat member of the lower member consolidating and curing and bonding the uncured fiber elements of a portion of the uncured fiber reinforced structure.

* * * * *

UNITED STATES PATENT AND TRADEMARK OFFICE
CERTIFICATE OF CORRECTION

PATENT NO. : 6,793,479 B1
APPLICATION NO. : 09/062046
DATED : September 21, 2004
INVENTOR(S) : Merret et al.

It is certified that error appears in the above-identified patent and that said Letters Patent is hereby corrected as shown below:

The title page showing the illustrative figure should be deleted to be replaced with the attached title page.

In the drawings:

In FIG. 2, change reference numeral "12'" located left of reference numeral "10" with associated arrow lead line to --12--

Please replace FIG. 2 with the following amended figure:

-- 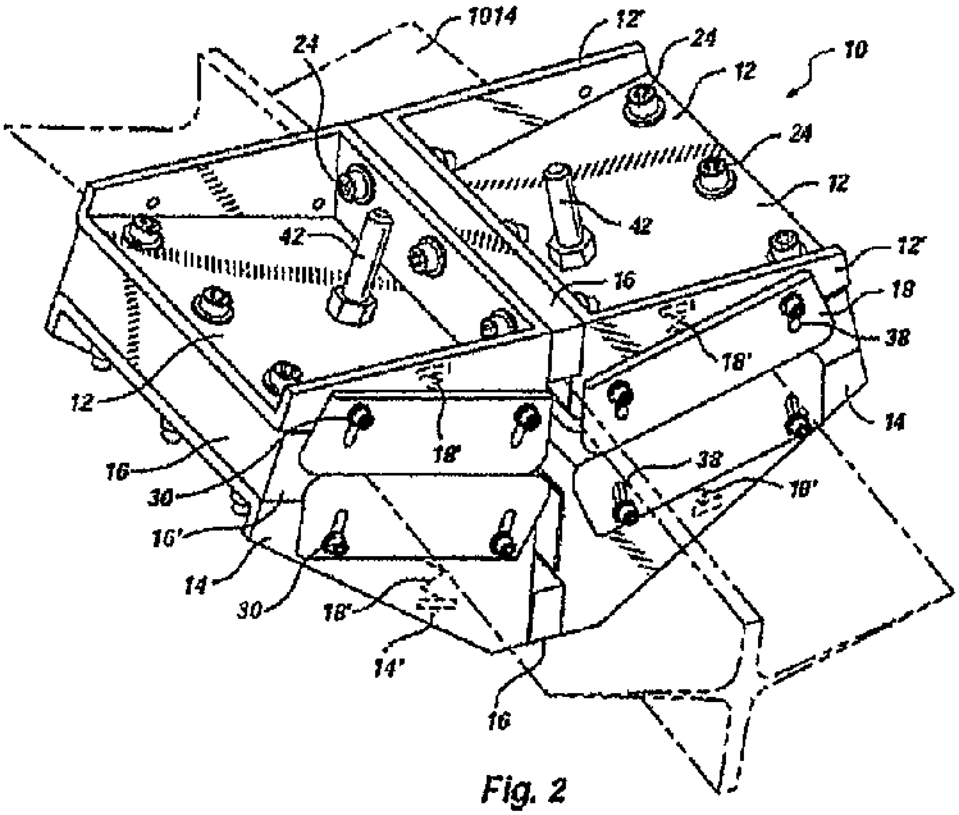 --

Fig. 2

CERTIFICATE OF CORRECTION

PATENT NO. : 6,793,479 B1 
APPLICATION NO. : 09/062046
DATED : September 21, 2004
INVENTOR(S) : Merret et al.

It is certified that error appears in the above-identified patent and that said Letters Patent is hereby corrected as shown below:

In the drawings (cont'd):

| | |
|---|---|
| **In FIG. 3,** | change reference numeral "12" located directly below reference numeral "10" with associated arrow lead line to --12'-- |

Please replace FIG. 3 with the following amended figure:

--

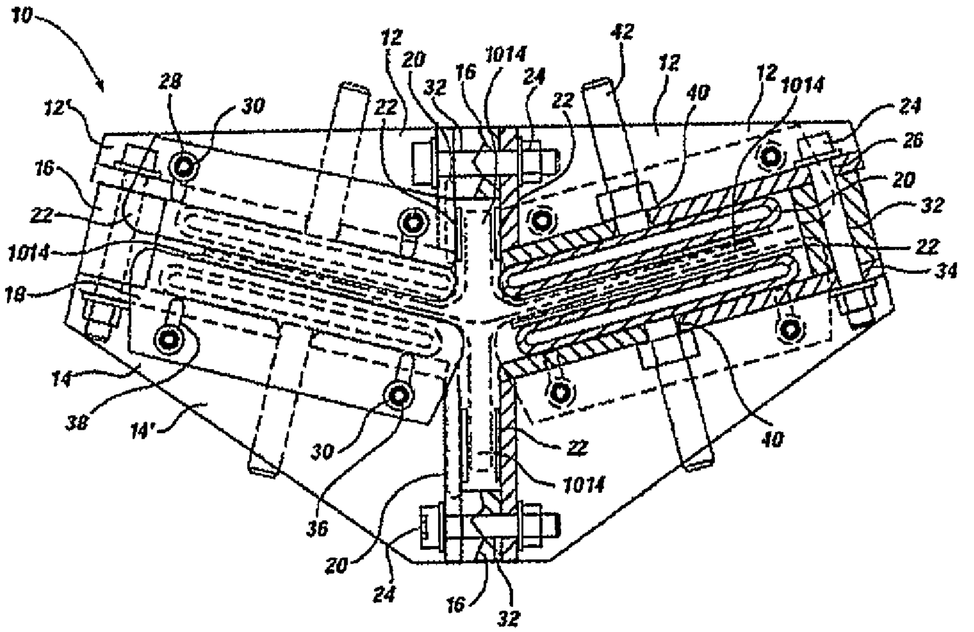

--

Fig. 3

| | |
|---|---|
| **In FIG. 5,** | insert two occurrences of reference numeral --142-- and associated lead lines extending from inlets located on upper members 112 |

UNITED STATES PATENT AND TRADEMARK OFFICE

CERTIFICATE OF CORRECTION

PATENT NO. : 6,793,479 B1
APPLICATION NO. : 09/062046
DATED : September 21, 2004
INVENTOR(S) : Merret et al.

It is certified that error appears in the above-identified patent and that said Letters Patent is hereby corrected as shown below:

In the drawings (cont'd):

Please replace FIG. 5 with the following:

-- 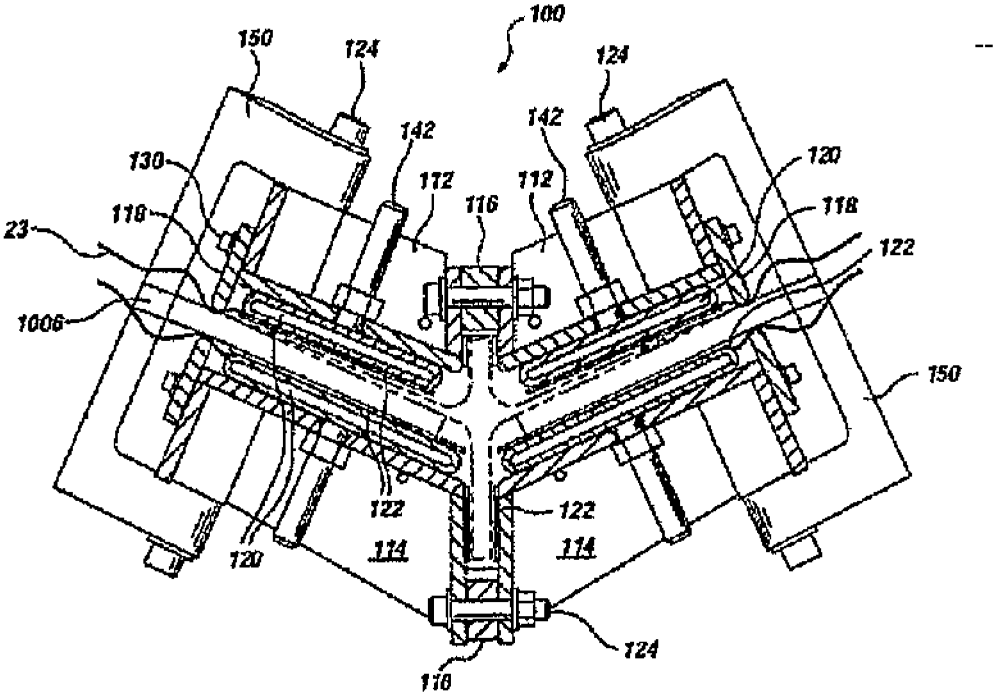 --

*Fig. 5*

In FIG. 10, insert reference numeral --430-- and associated lead line to uppermost fastener, disposed on end member 418, located on right hand side of drawing

UNITED STATES PATENT AND TRADEMARK OFFICE
CERTIFICATE OF CORRECTION

PATENT NO. : 6,793,479 B1 
APPLICATION NO. : 09/062046
DATED : September 21, 2004
INVENTOR(S) : Merret et al.

It is certified that error appears in the above-identified patent and that said Letters Patent is hereby corrected as shown below:

In the drawings (cont'd):

Please replace FIG. 10 with the following:

-- --

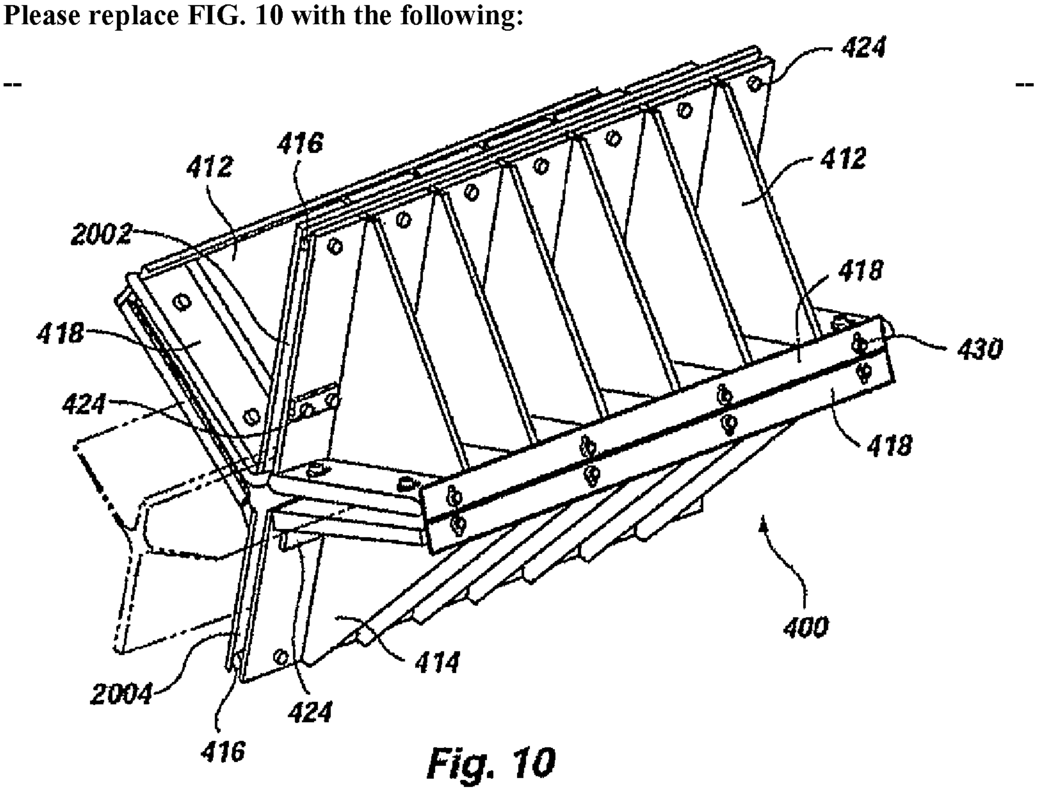

*Fig. 10*

In FIG. 11, delete reference numeral "2004" and associated lead line; change reference numeral "2009" to --2004--; insert reference numeral --442-- and associated lead line as depicted.

UNITED STATES PATENT AND TRADEMARK OFFICE

CERTIFICATE OF CORRECTION

PATENT NO. : 6,793,479 B1 Page 5 of 7
APPLICATION NO. : 09/062046
DATED : September 21, 2004
INVENTOR(S) : Merret et al.

It is certified that error appears in the above-identified patent and that said Letters Patent is hereby corrected as shown below:

In the drawings (cont'd):

Please replace FIG. 11 with the following amended figure:

-- --

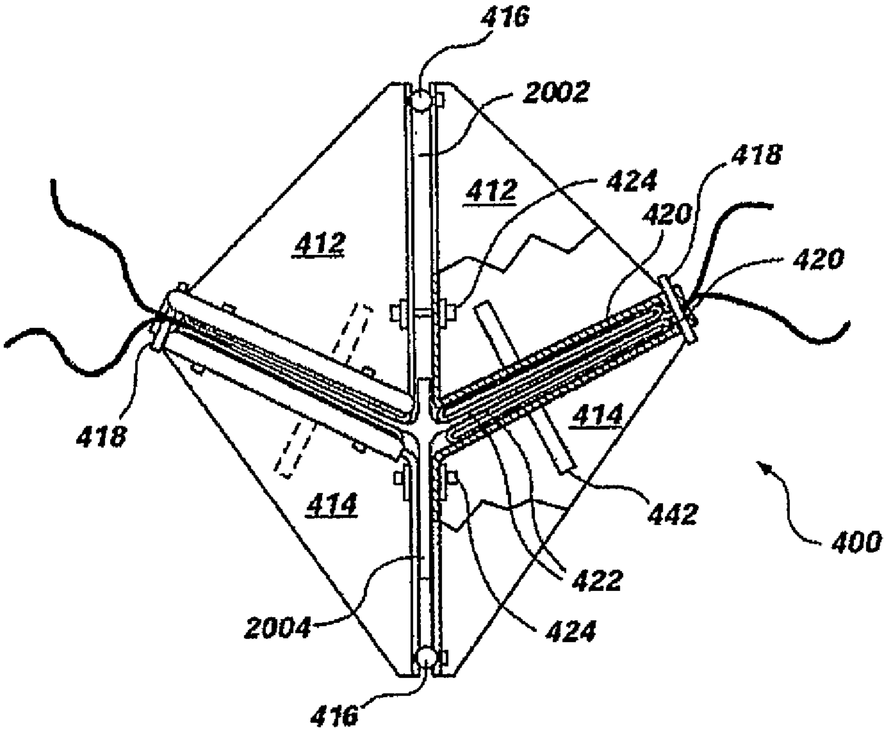

*Fig. 11*

In the specification:

COLUMN 3, LINE 45, change "individual end portions 12" to -- individual end portions 12'--

COLUMN 4, LINE 2, change "individual end portions 14" to -- individual end portions 14'--

COLUMN 5, LINE 27, change "include members 22" to --contain electrical wiring and connection 23 (drawing FIG. 5)--

UNITED STATES PATENT AND TRADEMARK OFFICE

CERTIFICATE OF CORRECTION

PATENT NO. : 6,793,479 B1 
APPLICATION NO. : 09/062046
DATED : September 21, 2004
INVENTOR(S) : Merret et al.

It is certified that error appears in the above-identified patent and that said Letters Patent is hereby corrected as shown below:

In the claims:

CLAIM 42, COLUMN 13, LINE 13, change "the upper members of the plurality" to --the plurality of the upper members--

Signed and Sealed this

Eleventh Day of December, 2007

JON W. DUDAS
*Director of the United States Patent and Trademark Office*

(12) United States Patent
Merret et al.

(10) Patent No.: US 6,793,479 B1
(45) Date of Patent: Sep. 21, 2004

(54) REMOTELY ACTUATED LOCALIZED PRESSURE AND HEAT APPARATUS AND METHOD OF USE

(75) Inventors: John B. Merret, Morgan, UT (US); DeVor R. Taylor, Kaysville, UT (US); Mark M. Wheeler, Kamas, UT (US); Dan R. Gale, Salt Lake City, UT (US)

(73) Assignee: Alliant Techsystems Inc., Edina, MN (US)

(*) Notice: Subject to any disclaimer, the term of this patent is extended or adjusted under 35 U.S.C. 154(b) by 0 days.

(21) Appl. No.: 09/062,046

(22) Filed: Apr. 17, 1998

(51) Int. Cl.[7] .......................... B29C 43/02; B29C 70/06

(52) U.S. Cl. .................. 425/501; 156/580; 156/583.1; 425/394; 425/508; 425/520; 425/405.1

(58) Field of Search ................................ 425/394, 403, 425/405.1, 501, 508, 520; 156/580, 583.1, 583.3

(56) References Cited

U.S. PATENT DOCUMENTS

| | | | | | |
|---|---|---|---|---|---|
| 3,012,601 | A | * | 12/1961 | Lee | 156/583.3 |
| 3,533,352 | A | * | 10/1970 | Miller | 156/583.3 |
| 3,775,033 | A | * | 11/1973 | Pfeiffer | 425/520 |
| 4,032,387 | A | * | 6/1977 | Sugiyama et al. | 156/583.3 |
| 4,247,355 | A | * | 1/1981 | Friedrick et al. | 156/583.3 |
| 4,248,649 | A | | 2/1981 | Harrison et al. | |
| 4,470,860 | A | | 9/1984 | Gill et al. | |
| 4,583,352 | A | * | 4/1986 | Heron | 156/583.3 |
| 4,704,183 | A | * | 11/1987 | Sigerist | 156/583.3 |
| 4,755,128 | A | * | 7/1988 | Alexander et al. | 425/520 |
| 4,776,996 | A | | 10/1988 | Ashton et al. | |
| 4,797,172 | A | | 1/1989 | Hebert et al. | |
| 5,022,845 | A | | 6/1991 | Charlson et al. | |
| 5,071,506 | A | | 12/1991 | Nelson et al. | |
| 5,108,532 | A | * | 4/1992 | Thein et al. | 156/583.3 |
| 5,173,315 | A | | 12/1992 | Charlson et al. | |
| 5,273,602 | A | | 12/1993 | Gill et al. | |
| 5,468,315 | A | * | 11/1995 | Okada et al. | 425/520 |
| 5,494,546 | A | * | 2/1996 | Horvath | 156/583.3 |
| 5,558,015 | A | * | 9/1996 | Miyashita et al. | 156/583.3 |
| 5,562,028 | A | * | 10/1996 | Bielfeldt et al. | 156/583.3 |
| 5,578,159 | A | * | 11/1996 | Miyashita et al. | 156/583.3 |
| 5,593,532 | A | * | 1/1997 | Falk et al. | 156/583.3 |
| 5,725,711 | A | * | 3/1998 | Taylor | 156/583.3 |
| 5,800,667 | A | * | 9/1998 | Kosaki et al. | 156/583.3 |
| 5,830,518 | A | * | 11/1998 | Oda | 425/520 |
| 5,840,347 | A | * | 11/1998 | Muramatsu et al. | 156/583.3 |

FOREIGN PATENT DOCUMENTS

| | | |
|---|---|---|
| JP | 59-079730 | 5/1984 |
| JP | 61-098529 | 5/1986 |
| JP | 63-180469 | 7/1988 |
| JP | 02-126434 | 5/1990 |

OTHER PUBLICATIONS

European Search Report dated Feb. 22, 2002.

* cited by examiner

*Primary Examiner*—James P. Mackey
(74) *Attorney, Agent, or Firm*—TraskBritt

(57) ABSTRACT

Apparatus and method for the use of a remotely actuated localized pressure and heat apparatus for the consolidation and curing of fiber elements in, structures. The apparatus includes members for clamping the desired portion of the fiber elements to be joined, pressure members and/or heat members. The method is directed to the application and use of the apparatus.

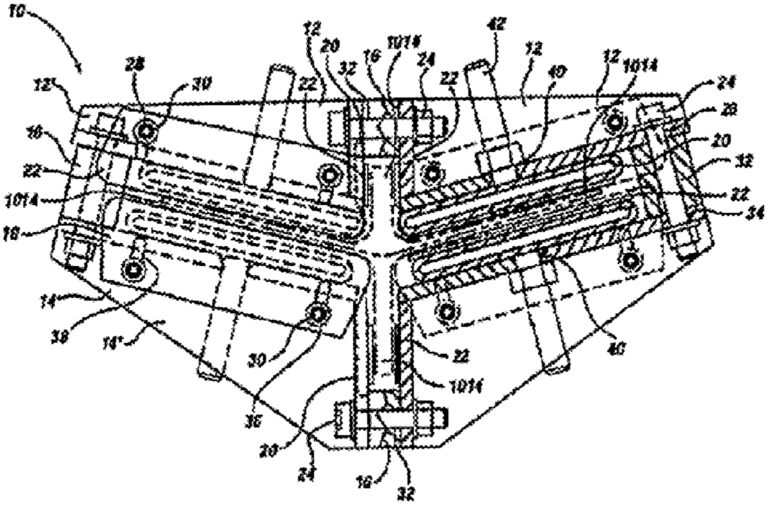

45 Claims, 11 Drawing Sheets